Dec. 11, 1945.   H. R. TRAPHAGEN   2,390,969
PLANTER
Filed March 27, 1943   2 Sheets-Sheet 1
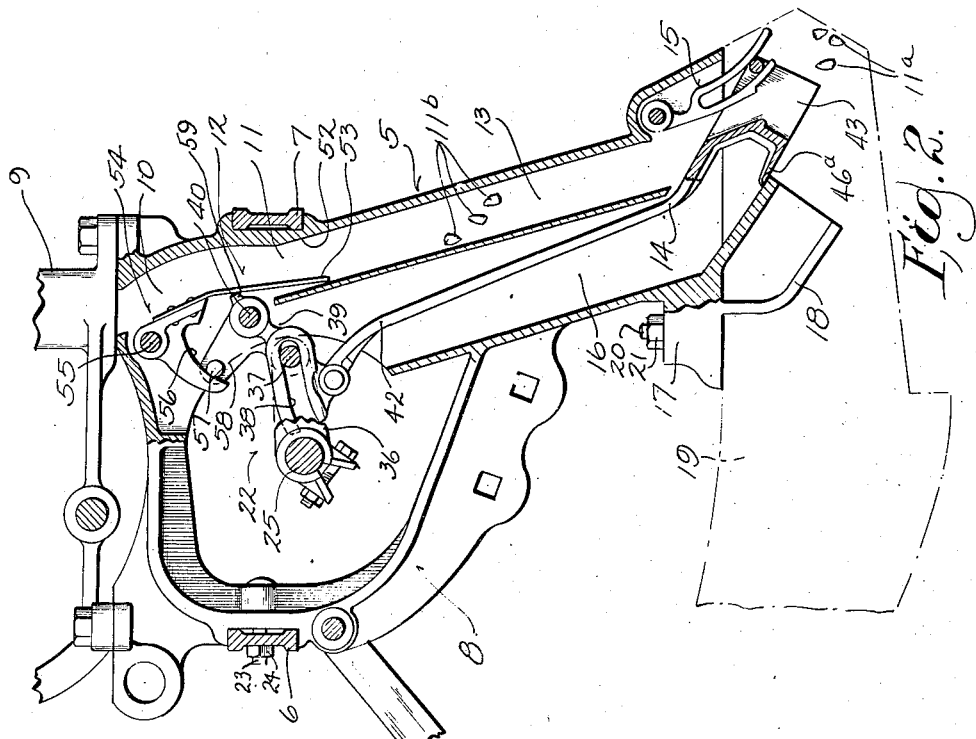
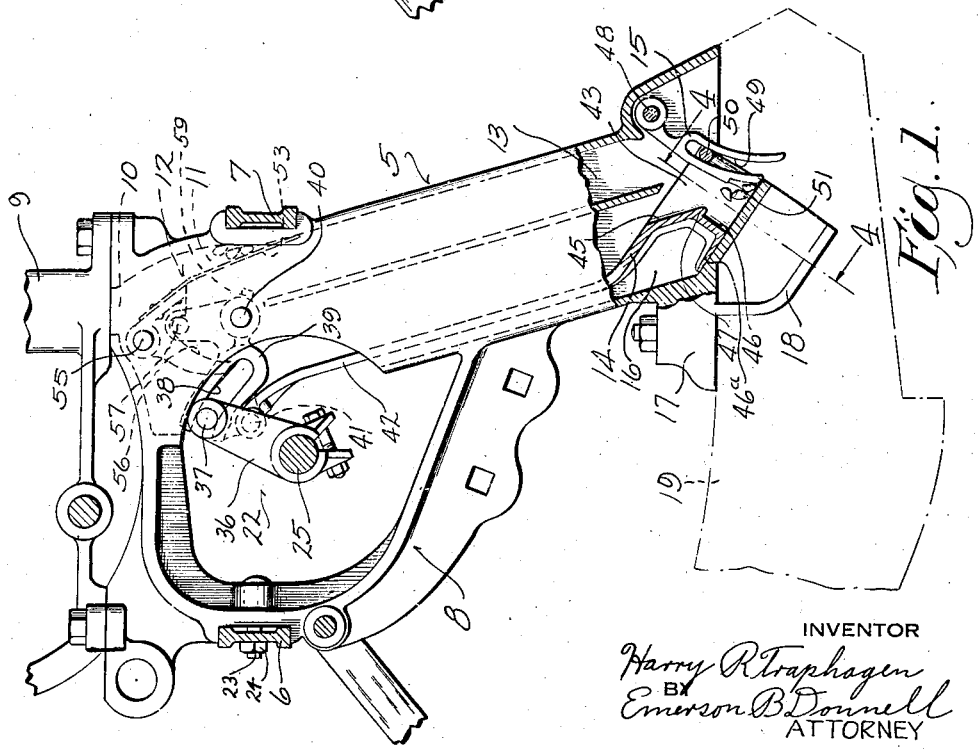
INVENTOR
Harry R Traphagen
BY Emerson B Donnell
ATTORNEY

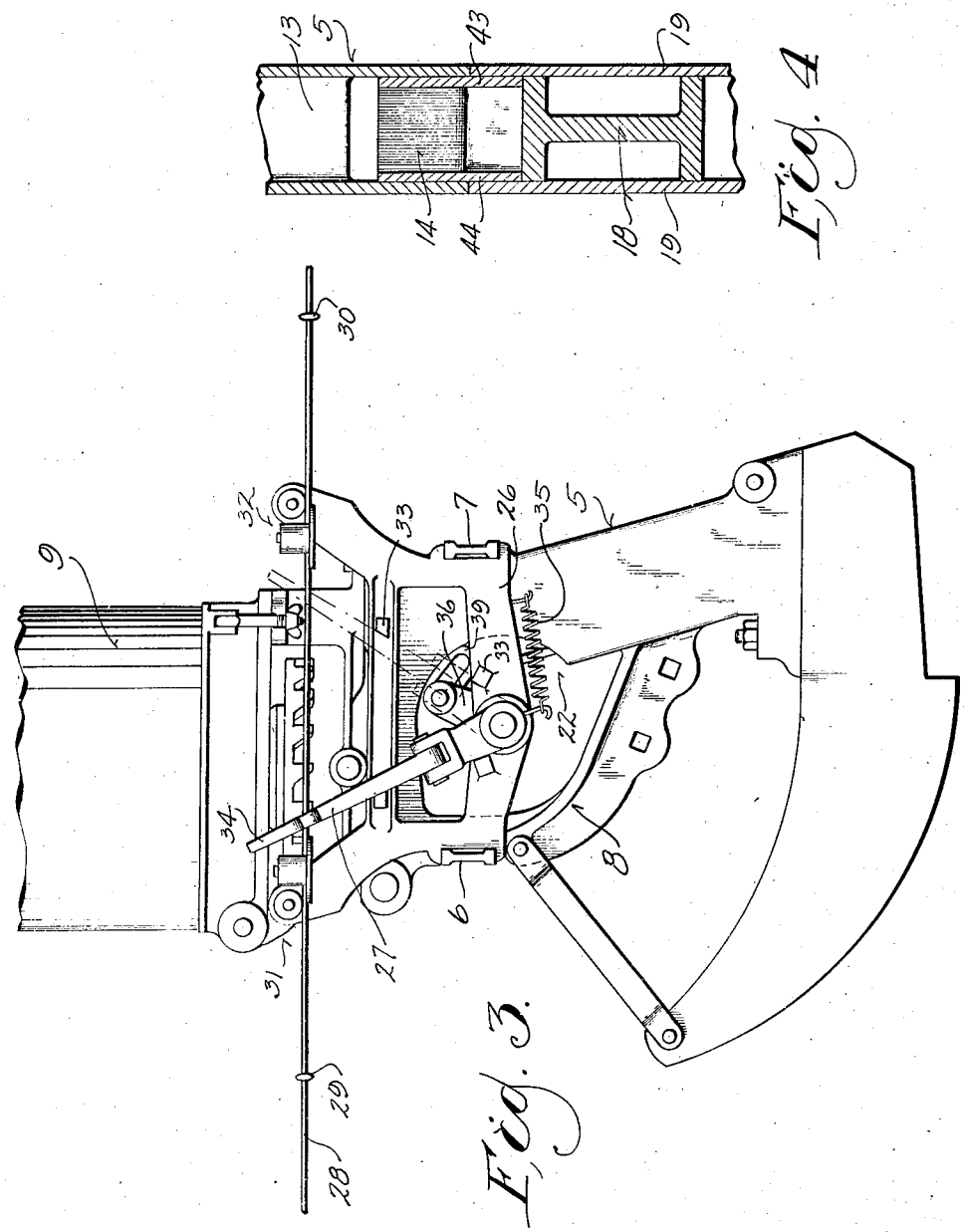

Patented Dec. 11, 1945

2,390,969

UNITED STATES PATENT OFFICE 2,390,969

PLANTER

Harry R. Traphagen, Rockford, Ill., assignor to J. I. Case Company, Racine, Wis., a corporation Application March 27, 1943, Serial No. 480,800

15 Claims. (Cl. 111—51)

The present invention relates to planters and more particularly to the seed dropping and ejecting expedients or so called valves for such planters, and an object of the invention is to generally improve the construction and operation of devices of this class.

A further object is to provide an improved valve which will perform accurate check-row planting at extremely high rates of travel.

A further object is to provide such a valve which will compensate for differences in rates of travel so that accurate checking will result whether the rate is fast or slow.

A further object is to provide such a valve which will operate without injuring the seeds being planted and further objects will become apparent from the following specification in which a satisfactory embodiment of the invention is shown, but it is to be understood that it is not limited to the details disclosed but includes all such variations and modifications as fall within the spirit of the invention as herein expressed.

Similar reference characters have been applied to the same parts throughout the specification and the accompanying drawings in which Figure 1 is a left side elevation with parts broken away of such portions of a planter seed dropping apparatus as necessary to illustrate the invention. Fig. 2 is a similar view with the parts in a different position.

Fig. 3 is an end view taken from the left, showing an actuating mechanism.

Fig. 4 is a sectional view taken on the line 4—4 of Fig. 1.

In the past, it has been necessary to drive quite slowly when check-row planting, in order to obtain accuracy. This is for the reason that the seed, in common with everything else associated with the planter, is of course moving along at the rate at which the planter is being driven or drawn by the tractor. The earth is of course intended to fall in place over the seed and immediately arrest its movement once it leaves the drop tube. At moderate speeds, this action is quite satisfactory. The furrow, however, has a tendency to remain open for a fraction of a second behind the runner and, at higher speeds, for example 4 or 5 miles per hour, due to the relatively high speed of the planter, there will be an appreciable space behind the runner and in front of the earth falling back into the newly formed furrow. In the past, the seeds have been ejected into this space and, since they partake of the rapid motion of the planter, one or more would occasionally roll along the bottom of the furrow ahead of the collapsing side walls thereof so that it would finally come to rest several inches away from the desired spot when it finally is buried under the falling earth. This is known as scattering and, of course, defeats the purpose of check-row planting. In the present device, this particular defect is eliminated by novel expedients which eject the seed rearwardly relatively to the planter at a rate commensurate or substantially equivalent to the rate of travel of the planter. The forward component of movement of the seed relatively to the ground is therefore destroyed together with the tendency of the seed kernels, to roll along the bottom of the furrow. Thus, the seeds fall "dead" from the rear of the rapidly moving seed dropping apparatus and the tendency to scatter is avoided. Other factors causing this well-known difficulty have been eliminated as will appear shortly.

As seen in Fig. 1, the device comprises generally a drop tube element generally designated as 5 carried in the present instance on elements 6 and 7 of a planter frame of suitable or well-known type which it is not necessary to describe further, it being understood that such planters commonly have two or more such devices, only one of which it is necessary to describe. Drop tube 5 has an enlarged upper housing portion generally designated as 8 with which above mentioned members 6 and 7 are engaged, portion 8 supporting a seed can and counting device 9, see also Fig. 3, arranged for counting and dropping predetermined quantities of seed into a passageway 10 by suitable or well-known expedients not shown and not necessary to be described.

In the operation of the device, the seeds are dropped periodically through passageway 10 and accumulate at 11 on an upper valve generally designated as 12 from which they are dropped in groups containing a predetermined number of seeds, for example 3, through a passageway 13, into the space between a plunger generally designated as 14 and a lower valve generally designated as 15. At predetermined intervals, plunger 14 is moved to the position indicated in Fig. 2 by mechanism to be described, valve 15 moving out of the way and the seeds accumulated at plunger 14 being forcibly ejected rearwardly from the device, as indicated at 11$^a$. Seeds at 11 are released from valve 12 at substantially the same time. However, before the latter seeds (11$^b$) can traverse the length of passageway 13, plunger 14 will have returned to the position shown in Fig. 1 so that seeds 11$^b$ will not be allowed to drop out of the rear of the device but will be caught in the space between plunger 14 and valve 15 as above described.

Returning to a more detailed description of the apparatus, drop tube 5, in addition to passageway 13, includes a passageway or chamber 16 in which above mentioned plunger 14 is reciprocable. The drop tube also has an ear 17 and a tongue portion 18 to which is attached a runner 19 of suitable or well-known type which opens the furrow for reception of the seed. A bolt 20 and a nut 21 is used in the present instance for holding a bifurcated runner 19 in place. Above mentioned enlarged portion 8 acts as a housing for certain mechanism generally designated as 22 for actuating plunger 14 and valve 12. A bolt 23 and nut 24 serve to fasten housing portion 8 to member 6.

As seen in Fig. 3, a check shaft 25 is journaled in a fitting 26 and carries a check fork 27 which engages a check wire 28 carrying buttons as 29 and 30. One or more sets of guiding rollers of well-known type as 31 and 32 are preferably provided, supported from fitting 26, fork 27 sliding along wire 28 in well-known manner as the planter moves over the field. When fork 27 encounters button 29 it is swung backwardly as indicated by dotted lines until it encounters a stop 33 whereupon button 29 is forced out of the forked end 34 and fork 27 is returned to the full line position as by a spring 35 connected in any suitable manner to tend to rotate shaft 25 in a counterclockwise direction as seen in Fig. 3. Thus check shaft 25 is rather abruptly oscillated a predetermined amount whenever check fork 27 encounters a button on wire 28 as is well-known in devices of this type. Within each of housings 8, check shaft 25 has a check arm 36, Figs. 1 and 2, in the present instance extending rearwardly and upwardly and having a pin or element 37 engaging a track or cam slot 38 in a rocker or control arm generally designated as 39 journaled for oscillation on a pin or the like 40. Rocker 39 has pivotally connected thereto at 41 a shank or stem portion 42 forming a part of above mentioned plunger 14. Stem 42 extends downwardly and rearwardly through above mentioned passageway 16, near the bottom thereof bending more sharply to the rear and terminating between a pair of side plates 43 and 44 as seen more particularly in Fig. 4. Shank portion 42 has a sharply downwardly sloping portion 45, Figs. 1 and 2, between side plates 43 and 44 and an impelling portion 46 between which is disposed a shoulder or lip 47. Shank 42 and side plates 43 and 44 occupy substantially all of the width of passageway 13 and in the position of the parts shown in Fig. 1, form a small chamber somewhat forwardly of passageway 13 for the reception of seeds. Portion 46 has a rearwardly and upwardly directed tongue 46ª for supporting plunger 14 when extended substantially out of passageway 16.

Above mentioned lower valve 15 is of a width to substantially close the lower end of both passageway 13 and the space between side plates 43 and 44, the valve being journaled on a pin 48 and having a slot or track 49 engaged in the present instance by a pin or the like 50 for swinging the valve upon reciprocation of the plunger.

It will now be apparent that oscillation of check fork 27 and shaft 25 causes corresponding oscillation of arm 36. The disposition of the parts is such that the first part of the movement of arm 36 carries pin 37 generally in the direction of track 38 so that substantially no effect is produced on rocker 39. However, during the latter part of the oscillation, pin 37 moves rocker 39 by engagement therewith at a rapidly decreasing distance from pivot pin 40. For this reason, a comparatively large movement is given to rocker 39 as well as a very rapid movement. The connection 41 with plunger 14 causes an extremely rapid movement of the plunger, including abutment portion 46, into the position shown in Fig. 2 with the result that abutment portion 46 encounters the seeds accumulated at lower valve 15 and expels them forcibly in a rearward and downward direction. The proportions of the parts, and location of the several pivots, is such that the rate of rearward projection of the seeds is substantially equivalent or at least commensurate with the rate of forward travel of the planter and, as will be apparent, this velocity of ejection of the seed kernels will vary substantially as the speed of movement of the planter. The seeds being projected rearwardly at the same speed relatively to the planter, that the planter is proceeding forwardly relatively to the ground, the component of movement of the seeds relatively to the ground becomes zero and the seeds accordingly remain where they are dropped to be covered by the closing furrow.

The impact of abutment 46 with the seeds accumulated at valve 15 might tend to cause deflection of the seeds in an unwanted direction. This tendency is checked by above mentioned shoulder 47 insofar as upward deflection is concerned. A shoulder 51 is also provided on valve 15. Trouble has been experienced in the past when high speed operation has been attempted in that one or more seeds would occasionally rebound from the lower valve and not be in position to be positively ejected by the plunger. These seeds would either drop out by gravity and without any forcible ejection, resulting in scattering, or they would be caught by the lower valve upon closing thereof. This, of course, would rob that particular hill of these seeds and cause the planting of them in the following hill, all of which is objectionable. In the present arrangement all of the surfaces which the seeds encounter as they reach the bottom of passageway 13 are inclined to the direction of dropping of the seeds so that any rebound or bouncing, being roughly at an angle to the surface equal to the angle of incident, at which they first encounter the surface, will be lateral to the direction of falling and not vertically back up passageway 13. The momentum of the seeds in falling is therefore effectively dissipated with as little rebound as possible, the seeds coming to rest, substantially invariably, in time to be positively ejected by plunger 14. Also, shoulders 47 and 51 are located to tend to intercept any seeds which might rebound from the surface of tongue 18 and accordingly also assist in preventing scattering or missing due to such rebound.

Upper valve 12, as above suggested, is so constituted as to accumulate seeds a substantial distance down passageway 13 as compared with prior practice so that the distance which the seeds drop will be less than heretofore, resulting in a quicker drop and less inertia and tendency to bounce upon reaching valve 15. There is time for the seeds to come to rest before plunger 14 is actuated. Valve 12 is adapted to swing in passageway 13 and is arranged to yield in the event that any seed should occasionally be caught between the valve and the wall 52 of the passageway. In this manner, crushing or damaging of the seeds is avoided.

Although this may be accomplished in various ways within the contemplation of the invention, in the present instance valve 12 comprises a spring leaf 53 of a width sufficient to substantially block passageway 13 and fixed in any suitable manner with a cam element or unit 54 journaled on a pin or the like 55. Element 54 has a cam track or surface 56 engaged by an element 57 carried by an arm 58 on above mentioned rocker 39. As seen in Fig. 1, element 57 is resting in a portion of cam track 56 which maintains unit 54 in the position shown in Fig. 1 with leaf 53 substantially against the rear wall of passageway 13. The shape of track 56 is so chosen in the present instance that the beginning of the rocking movement of rocker 39 in a counterclockwise direction immediately rocks unit 54 in a clockwise direction thus swinging leaf 53 toward the front wall of passageway 13, in the present instance against a stop 59 extending from rocker 39 in the path of leaf 53. The shape of track 56 is preferably such that substantially the whole movement of valve 12 takes place during the initial movement of rocker 39, the remainder of the movement of the rocker having little or no effect on unit 54. Upon return movement of rocker 39 substantially no effect is produced upon unit 54 until the latter part of the movement of the rocker, whereupon valve 12 is rapidly closed. In the present instance, if a seed should occasionally be caught between leaf 53 and passageway 13, leaf 53 will yield sufficiently to avoid damaging the seed until such time as valve 12 again opens, whereupon the seed will be dropped in the usual manner.

The operation of the device is thought to be clear from the above description of an illustrative embodiment of the invention, and what is claimed as new and desired to be secured by Letters Patent of the United States is:

1. In a planter, a valve including a seed counting device, a drop tube and a plunger, a check shaft, mechanism for periodically oscillating the check shaft, an arm on the check shaft, a rocker pivotally supported adjacent said drop tube, said arm being engaged with said rocker so as to rotate it in the opposite direction to the rotation of said arm, a supplemental arm on said rocker, a cam unit pivoted adjacent said drop tube and engaged with said arm so as to be rotated in a direction opposite to the rotation of said rocker by rocking of said rocker, and a seed retaining valve connected to said cam unit and depending from said cam unit to a position spaced down said drop tube substantially from said counting device.

2. In a planter, a valve including a seed counting device, a drop tube and a plunger, a check shaft, mechanism for periodically oscillating the check shaft, an arm on the check shaft, a rocker pivotally supported adjacent said drop tube, said arm being engaged with said rocker so as to rotate it in the opposite direction to the rotation of said arm, a supplemental arm on said rocker, a cam unit pivoted adjacent said drop tube and engaged with said arm so as to be rotated in a direction opposite to the rotation of said rocker by rocking of said rocker, and a seed retaining valve connected to said cam unit and depending from said cam unit.

3. In a planter, a valve including a seed counting device, a drop tube and a plunger, a check shaft, mechanism for periodically oscillating the check shaft, an arm on the check shaft, a rocker pivotally supported adjacent said drop tube, said arm being engaged with said rocker so as to rotate it in the opposite direction to the rotation of said arm, a supplemental arm on said rocker, and a cam unit pivoted adjacent said drop tube and engaged with said arm so as to be rotated in a direction opposite to the rotation of said rocker by rocking of said rocker.

4. In a planter, a valve including a seed counting device, a drop tube and a plunger, a check shaft, mechanism for periodically oscillating the check shaft, an arm on the check shaft, a rocker pivotally supported adjacent said drop tube, said arm being engaged with said rocker so as to rotate it in the opposite direction to the rotation of said arm, a supplemental arm on said rocker, a cam unit pivoted adjacent said drop tube and engaged with said arm so as to be rotated in a direction opposite to the rotation of said rocker by rocking of said rocker, a seed retaining valve connected to said cam unit and depending from said cam unit to a position spaced down said drop tube from said counting device, a normally closed lower valve actuated by said plunger, said plunger having an ejecting portion and a sloping portion, and a seed retaining lip between said ejecting and said sloping portions.

5. In a planter, a valve including a seed counting device, a drop tube and a plunger, a check shaft, mechanism for periodically oscillating the check shaft, an arm on the check shaft, a rocker pivotally supported adjacent said drop tube, said arm being engaged with said rocker so as to rotate it in the opposite direction to the rotation of said arm, a supplemental arm on said rocker, a cam unit pivoted adjacent said drop tube and engaged with said arm so as to be rotated in a direction opposite to the rotation of said rocker by rocking of said rocker, a seed retaining valve connected to said cam unit and depending from said cam unit to a position spaced down said drop tube from said counting device, a normally closed lower valve actuated by said plunger, said plunger having an ejecting portion and a sloping portion, a seed retaining lip between said ejecting and said sloping portions, and a seed retaining lip on said lower valve.

6. In a planter, a valve including a seed counting device, a drop tube and a plunger, a check shaft, mechanism for periodically oscillating the check shaft, an arm on the check shaft, a rocker pivotally supported adjacent said drop tube, said arm being engaged with said rocker so as to rotate it in the opposite direction to the rotation of said arm, a supplemental arm on said rocker, a cam unit pivoted adjacent said drop tube and engaged with said arm so as to be rotated in a direction opposite to the rotation of said rocker by rocking of said rocker, a seed retaining valve connected to said cam unit and depending from said cam unit to a position spaced down said drop tube from said counting device, a normally closed lower valve actuated by said plunger, said plunger having an ejecting portion and a sloping portion, a seed retaining lip between said ejecting and said sloping portions, a seed retaining lip on said lower valve, and a backwardly extending tongue on said plunger for supporting the latter in its extreme forward ejecting position.

7. In a planter valve, including a seed counting device, a drop tube and a plunger, a check shaft, mechanism for periodically oscillating the check shaft, an arm on the check shaft describing a curved path upon oscillation of said check shaft, a rocker pivotally supported adjacent said drop tube and connected for reciprocating said plunger, and having a track engaged by said arm, said track having a portion transverse to the path of travel of said arm and another portion conforming to the path of travel of said arm for a portion of the length of said path, for travel of said arm without affecting said rocker during part of the oscillation of said check shaft.

8. In a high speed planter valve, the combination of a check shaft, an arm on said check shaft, a rocker member having a track and pivotally supported in spaced relation to said shaft, means on said arm engaging said track for rocking said rocker upon oscillation of said check shaft and arm, a seed ejecting plunger, an upper valve, a connection from said rocker to said plunger for reciprocating the latter upon rocking of said rocker, and a separate connection from said rocker to said upper valve for actuating said valve upon rocking of said rocker.

9. In a high speed planter valve, the combination of a check shaft, an arm on said check shaft, a rocker member pivotally supported in spaced relation to said shaft, and having a track, means on said arm engaging said track for rocking said rocker upon oscillation of said check shaft and arm, a seed ejecting plunger, an upper valve, a connection from said rocker to said plunger for reciprocating the latter upon rocking of said rocker, and a separate connection from said rocker to said upper valve for actuating said valve upon rocking of said rocker, and the position of said track being so chosen as to provide for free movement of said arm without substantial movement of said rocker during the first part of the movement of said arm, and to cause relatively rapid movement of said rocker during the latter part of the movement of said arm.

10. In a planter valve including a drop tube and a plunger, a check shaft, mechanism for periodically oscillating the check shaft, an arm on the check shaft describing a predetermined path upon oscillation of said check shaft, a member movably supported and connected for actuating said plunger, said member having a track engaged by said arm, said track having a portion conforming substantially to the path of travel of said arm for a portion of the length of said path, but said track deviating from the path of travel of said arm to an increasing extent toward the end of the path of travel of said arm.

11. In a planter valve, including a drop tube and a plunger, a check shaft, mechanism for periodically oscillating the check shaft, an arm on the check shaft describing a curved path upon oscillation of said check shaft, a rocker pivotally supported adjacent said drop tube and connected for reciprocating said plunger, said rocker having a track engaged by said arm, said track having a portion conforming substantially to the path of travel of said arm but deviating increasingly from said path of travel toward the end of the movement of said arm, said arm approaching the point of pivotal support of said rocker as the end of said path is approached, whereby the rate of movement of said rocker is substantially increased as the end of oscillation of said arm is approached.

12. In a planter, a valve including a seed counting device, a drop tube and a plunger, means for reciprocating the plunger for ejecting seed from the drop tube, said plunger having an ejecting portion and a sloping portion, and a seed retaining lip between said ejecting portion and said sloping portion.

13. In a planter, a valve including a seed counting device, a drop tube and a plunger, means for reciprocating the plunger for ejecting seed from the drop tube, said plunger having an ejecting portion and a sloping portion, a normally closed lower valve actuated by said plunger, a seed retaining lip between said ejecting portion and said sloping portions, and a seed retaining lip on said lower valve.

14. In a planter, a valve including a seed counting device, a drop tube and a plunger, means for reciprocating the plunger for ejecting seed from the drop tube, said plunger having an ejecting portion, a normally closed valve actuated by said plunger, a seed retaining lip on said ejecting portion, and a seed retaining lip on said valve, said lips being positioned to confine seed falling down said drop tube so as to prevent said seed from rebounding away from the region of said ejecting portion.

15. In a planter, means providing a seed counting device and a drop tube, a check shaft, mechanism for periodically oscillating the check shaft, an arm on the check shaft, a rocker pivotally supported adjacent said drop tube, said arm being engaged with said rocker so as to rotate it in the opposite direction to the rotation of said arm, a supplemental arm on said rocker, a cam unit pivoted adjacent said drop tube and engaged with said arm so as to be rotated in a direction opposite to the rotation of said rocker by rocking of said rocker, and a seed retaining spring leaf connected to said cam unit and depending from said cam unit to a position spaced down said drop tube from said counting device.

HARRY R. TRAPHAGEN.